United States Patent Office 3,652,610
Patented Mar. 28, 1972

3,652,610
PLASTICIZERS FROM HINDERED ACID GLYCOL MONOESTERS
Myron Coopersmith, New York, N.Y., and Gerald Rubin, Fords, and Edward Wickson, Scotch Plains, N.J., assignors to Esso Research and Engineering Company
No Drawing. Filed Nov. 22, 1966, Ser. No. 600,343
Int. Cl. C07c 69/34, 69/76; C11c 3/04
U.S. Cl. 260—410.6
2 Claims

ABSTRACT OF THE DISCLOSURE

Novel esters having the generic formula:

(I) 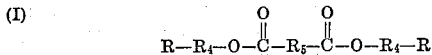

and (II) 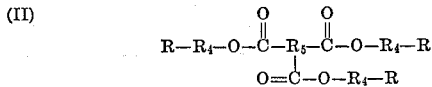

wherein R has the following general formula:

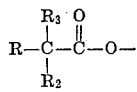

wherein $R_1$, $R_2$ and $R_3$ are each $C_1$–$C_{20}$ hydrocarbyl radicals, $R_4$ is selected from the group consisting of $C_2$–$C_{15}$ alkyl, aryl, cycloalkyl and alkaryl radicals, and $R_5$ is selected from the group consisting of $C_0$–$C_{15}$ alkyl, aryl, cycloalkyl and alkaryl radicals, are prepared by the reaction of a neo-acid glycol monoester with a di- or tri-basic acid or anhydrides. The novel esters formed by the above-described process are prepared in substantially pure form and find usefulness as excellent plasticizers and lubricants.

---

This invention relates to the preparation of a novel class of organic esters which are useful as plasticizers. More particularly, this invention relates to the preparation of substantially pure organic esters by the reaction of a hindered acid glycol monoester and di- or tri-basic acids or anhydrides. Still more particularly, this invention relates to the preparation of novel esters having the generic formulae:

(I) 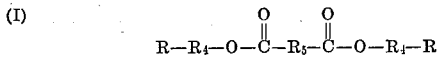

(II) 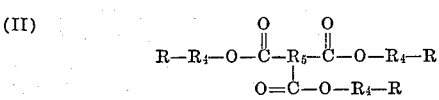

wherein R represents a sterically hindered carboxyl radical, $R_4$ is selected from the group consisting of $C_2$–$C_{15}$ alkyl, aryl, cycloalkyl, and alkaryl radicals and $R_5$ is selected from the group consisting of $C_0$–$C_{15}$ alkyl, aryl, cycloalkyl and alkaryl radicals.

Generally, many polymeric materials, e.g. vinyl halides, cellulosics, etc. are of a relatively hard and brittle nature, insoluble in most solvents and not easily softened. In order to improve the processability, i.e. ease with which these polymers may be fabricated, and to improve the softness, flexibility, impact strength, etc. so that the resulting product is usable, it is necessary to add a plasticizing agent to the polymer. The basic attributes of a good plasticizer are:

(1) compatible with the polymer or resin it is to plasticize;
(2) capable of imparting desired processability and softness, etc.;
(3) thermally stable under the conditions of processing and subsequent aging; and
(4) permanent, i.e. resistant to loss, particularly through volatilization, but also through solvent extraction, migration or exudation.

Compatibility is normally defined as the ability of the plasticizer to remain more or less homogeneously dispersed throughout the resin composition, particularly on aging. Permanence refers to the tendency of the plasticizer to resist loss through volatilization, chemical breakdown, extraction by water, soapy water, or organic solvents, migration and exudation. Other important attributes of a plasticizer are efficiency, i.e. the amount of plasticizer required to impart desired properties (depending on relative costs of the plasticizer and resin, high efficiency can reduce or increase the costs of the plasticized resin composition), ability to impart low temperature flexibility to a resin, ability to allow ease of processing to the resin system, i.e. flows and molds or extrudes readily, and the like.

Plasticizers may be generally divided into two classes: monomeric and resinous (polymeric). The former is illustrated by phthalate esters, e.g. di-2-ethylhexyl, phosphate esters, e.g. tricresyl, etc. These materials, however, because of their relatively low molecular weight lack permanence, i.e. they are volatile and are not used in applications where significant loss of plasticizer from volatilization is to be avoided, e.g. 105° C. vinyl wire insulation. The resinous or polymeric type plasticizers are best illustrated by polyesters. This type of plasticizer may be further subdivided into two groups:

(1) those with relative ease of handling, i.e. relatively low viscosity; and
(2) those characterized as high viscosity plasticizers.

The first group contains generally low boiling fractions that result in a lack of permanence. The second group sacrifices a degree of fluidity for more permanence. Thus, as a general rule, applicable to polyester type plasticizers, an increase in permanence is normally directly related to decreases in fluidity and ease of handling. The cause of this interaction may be attributed to the manner in which polyester type plasticizers are prepared. Polyester type plasticizers are generally prepared by the reaction of dicarboxylic acids, dihydric alcohols and monobasic acids. (See U.S. Pats. 2,106,703, 2,820,802, 3,149,087, and 3,167,524 as examples of the preparation of polyester type plasticizers.) Thus, the reaction mixture contains two bifunctional compounds and a monofunctional compound. The resulting product, i.e. the polyester type plasticizer composition, is comprised of a variety of products ranging from monoesters to long chain ester polymers. The concentration of products and, therefore, the molecular weight distribution of the products, may be varied by the ratio of reactants, order of addition reactants, temperature, time, catalyst concentration, etc. Consequently, the resulting plasticizer may be more or less tailored for fluidity (low molecular weights) of permanence (higher molecular weights). However, one property must be sacrificed in order to obtain the other. Furthermore, plasticizers of these types vary in composition since they always contain a mixture of products. Consequently, even in the permanent type plasticizers a portion of the mixture will contain relatively low molecular weight species and will tend to be volatile. The permanent type plasticizers, because of their relatively high molecular weight, have a tendency to solidify at only slightly depressed temperatures, thereby imparting poor low temperature properties to the plasticized composition.

It is highly desirable therefore, to have a substantially pure compound as a plasticizer so as to eliminate the problems inherent when mixtures, as known to the prior art, are employed. Further, it is highly desirable to have a plasticizer in which permanence of the order imparted by high molecular weight resinous type plasticizers is combined with the fluidity and ease of processing of the order found with the low molecular weight plasticizers. By the practice of this invention, it is now possible to selectively prepare a substantially pure, e.g. >95% purity compound which is useful as a plasticizer and combines the qualities of excellent permanence, low temperature fluidity, ease of processing and high efficiency.

In accordance with this invention, therefore, a hindered acid glycol monester is reacted with di- or tri-basic acids or their anhydrides, under esterification conditions, to selectively produce a novel class of compounds having the generic formulae:

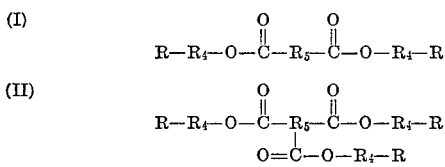

wherein R is a $C_4$-$C_{65}$ sterically hindered carboxyl radical; $R_4$ is selected from the group consisting of $C_2$-$C_{15}$ divalent alkyl, aryl, cycloalkyl, alkaryl radicals, preferably $C_2$-$C_8$ aliphatic, more preferably $C_2$-$C_6$ aliphatic radicals; and $R_5$ is selected from the group consisting of $C_0$-$C_{15}$ divalent alkyl, aryl, alkaryl and cycloalkyl radicals, preferably $C_0$-$C_{11}$ alkyl and aryl radicals, more preferably $C_4$-$C_{11}$ alkyl radicals. (Tetra-basic acids or anhydrides may also be employed the product then containing a total of eight ester linkages.)

It is believed that the novel compounds of the present invention are useful as excellent plasticizers because of their purity, i.e., lack of relatively low and relatively high molecular weight species as compared to typical polyester plasticizers and their molecular structure.

The molecular structure of these novel compounds, particularly the sterically hindered structure of the glycol monoester is believed to contribute to the thermal stability of the compounds. Compounds possessing this structure are known to have a significant degree of thermal stability and resistance to chemical attack.

To illustrate another advantageous property, i.e. low temperature handling, equal quantities of one of the novel compounds of this invention (formed by the reaction of the monoethoxylate of neo-decanoic acid and azelaic acid) and a standard resinous type polymeric plasticizer were refrigerated and Table I below shows some relative viscosity data for these compounds.

TABLE I

| Compound | Viscosity, cs. | |
|---|---|---|
| | At 77° F. | At 0° F. |
| Polymeric plasticizer | 7,137 | Solid |
| Bis(neo-decanylethyl) azelate | 101.8 | 4,797 |

The purity of the novel compound prepared in this invention is believed to be due to the sterically hindered structure of the carboxylic acid ester groups of the hindered acid glycol monoester. The utilization of an unhindered or straight chain structure of the monoester in the reaction with the acid or anhydride does not only lead to similar esters but in addition the well-known ester interchange reaction occurs which leads to the formation of diesters and glycols. These latter compounds, i.e. glycols react with the acid or anhydride to produce polymeric compositions of varying molecular weight; thus defeating the ends of this invention by resulting in compositions similar to those presently in use in the art. Further, it is essential when preparing the products of this invention that the starting material be the monoester, otherwise a product mix of varying esters, diesters, etc. will result and selectivity will be lost.

The hindered acid glycol monoesters applicable to this invention may be represented by the generic formula:

$$R\text{---}R_4\text{---}OH$$

wherein R and $R_4$ are as previously defined. The preparation of these compounds is disclosed in copending application, Ser. No. 482,267, filed Aug. 24, 1965 by A. J. Rutkowski and M. Coopersmith. Briefly stated, the process described therein involves the reaction of a sterically hindered acid with an alkylene oxide under esterification conditions. Alkylene oxides such as ethylene oxide, propylene oxide, butylene oxide, glycidyl ethers, styrene oxide and the like, may be employed. The hindered acids utilized are thole wherein the carboxyl groups is stericalsy blocked or hindered. A discussion of steric hindrance may be found in Newman, Steric Effects in Organic Chemistry, 1956, pp. 204–207. Generally, steric hindrance results from substitution of α, β, or γ carbon atoms of the acid; increasing substitution leading to increased hindrance. A class of particularly preferred sterically hindered acids are the neo-acids (neo- is used to denote a carbon atom that is bonded to four other carbon atoms, e.g. as in neo-pentane also known as 2,2-dimethylpropane). Thus, R is preferably further defined by the formula:

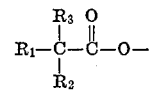

wherein $R_1$, $R_2$ and $R_3$ are each $C_1$-$C_{20}$ hydrocarbyl radicals, and $R_1$ is preferably a $C_5$-$C_{13}$ alkyl radical while $R_2$ and $R_3$ are preferably $C_1$-$C_2$ alkyl radicals. Some typical examples of neo-acids are: trimethylacetic acid, dimethyl cyclohexylacetic acid, dimethyl phenylacetic acid, ethylene diamine tetraacetic acid and pyromellitic dianhydride and the like.

In order to form the novel compounds of this invention, the hindered acid glycol monoester is reacted with a di- or tri-basic acid or anhydride. Generally, these di- or tri-basic acids may be saturated or unsaturated, aliphatic or aromatic and substituted or unsubstituted. Thus, the choice of acid or anhydride is not critical and many types are applicable to this invention. Typical of the di- or tri-basic acids which may be employed are: maleic, fumaric, succiniic, glutaric, adipic, pimelic, suberic, azelaic, sebacic, phthalic, isophthalic, terephthalic, trimellitic, citric, and the like. The acid anhydrides can be used interchangeably; thus, succinic anhydride, phthalic anhydride, trimellitic anhydride, etc. are also equally applicable. The central portion of these acids, i.e. that between the carboxyl groups, is described by $R_5$ in the previosuly shown formulae. (Thus, the acids or anhydrides may contain from 2–17 carbon atoms.)

The conditions under which this reaction occur may be generally described as esterification conditions and will be known to those skilled in the art. Both temperature and pressure are not critical and may vary over wide ranges. Temperatures ranging from about 80 to 250° C. can be employed, while temperatures of 110 to 215° C. are preferred. Pressures may also vary widely, e.g. 1–10 atm. The molar ratio of monoester to acid or anhydride is not critical and should be at least stoichiometric, i.e., one mole of monoester per mole of carboxyl radical. However, an excess is normally employed and the molar ratio may range from stoichiometric to a 100% excess, preferably stoichiometric to a 50% excess, more preferably to a 10% excess of monoester. The reaction period is not critical, as distinguished from the preparation of prior art plasticizers, and may range from a few minutes, e.g. 10 minutes to several hours, e.g. 20 hours. However, the reaction should be carried out for periods of time sufficient to allow for the reaction of substantially all of the acid or anhydride.

The reaction may be carried out with or without a solvent or entrainer to remove water formed during the reaction. The presence of an entrainer is preferred, however, and aliphatic or aromatic hydrocarbons may be employed. For example, $C_5$–$C_{20}$ paraffins, e.g. heptane, octane, decane, etc., $C_6$–$C_{20}$ aromatics, e.g. benzene, toluene, xylene, etc. Entrainers, when employed, should normally comprise about 3–90 wt. percent of the reaction mixture, preferably 5 to 20 wt. percent.

Esterification reactions are normally conducted in the presence of catalytic amounts of an esterification catalyst. Illustrative of these catalysts are the strong mineral acids, e.g. $H_2SO_4$ and others such as hypophosphorous acid, p-toluenesulfonic acid, etc. or metal salts such as stannous oxalate. The amount of catalyst may range from about 0.05 to 5.0 wt. percent based on total weight of reactants, preferably 0.1 to 0.5 wt. percent.

The novel compounds thus formed may be used as is, but are preferably further purified by such standard methods as: base wash followed by water wash until neutral, stripping at about 270° C. under vacuum with or without the presence of charcoal, treatment with activated alumina or attapulgus clay or celite, molecular distillation and the like.

Generally, the novel plasticizers of this invention can be employed with a wide variety of synthetic resins and may also be used as a lubricant for synthetic textile fibers, aircraft engines, and automatic transmission fluids. However, they are preferably employed to plasticize the thermoplastic resins, particularly the vinyl resins, cellulosic resins and acrylic and methacrylic resins. However, synthetic rubber can also be plasticized with these esters. The end use of these plasticized resins may be coating materials, molding or extruding materials, calendered sheeting, etc.

The vinyl resins may be derived from such compounds as vinyl halides, vinylidene chloride, vinyl acetate, etc. These resins may also include the copolymers of vinyl compounds and other unsaturated monomers copolymerizable therewith. Illustrative of these are the copolymers of a vinyl halide, e.g. vinyl chloride, with vinylidene chloride, vinyl esters of carboxylic acids, e.g. vinyl acetate, esters of unsaturated acids, e.g. alkyl acrylates such as methyl acrylate and the corresponding esters of methacrylic acid; 2,5-dichlorostyrene, vinyl naphthalene; dienes, e.g. butadiene, chlorobutadiene; unsaturated amides, e.g. acrylic acid amides, acrylic acid anilide; unsaturated nitriles, e.g. acrylic acid nitriles; esters of $\alpha,\beta$-unsaturated carboxylic acids, e.g. the methyl, ethyl, propyl, etc. esters of maleic, citraconic, itaconic and fumaric acids and the like.

The esters of unsaturated acids, e.g., the acrylates and methylacrylates can be polymerized by themselves to form another class of polymers compatible with the novel plasticizers of this invention. Cellulosic resins, such as cellulosic esters and mixed esters, e.g. cellulose acetate, cellulose acetate butyrate, cellulose nitrate, and the like, form another class of desirable polymers with which these novel plasticizers are useful. See also U.S. 3,167,524 for halogen resin systems.

The vinyl resins, particularly the vinyl halides, e.g. polyvinyl chloride and copolymers of vinyl halides are preferred.

The amount of plasticizer employed with any resin system will vary widely based on specific desired properties and the resin system itself. However, the plasticizer may be employed in amounts ranging from about 1 to 100% by weight, based on resin, and preferably 10 to 70 wt. percent. Higher amounts, i.e. 80–200 wt. percent may be employed in making foamed materials.

In many instances, it is desirable to blend into the plasticizer-resin composition such common additives as fillers, clays, pigments, light and heat stabilizers, lubricants, antioxidants, etc. It is apparent that such compositions are well within the scope of this invention.

Having now described this invention, a better appreciation of the advantages gained may be had by reference to the following examples. However, no limitations other than those in the claims appended hereto are to be implied from these examples.

EXAMPLE 1

Preparation of bis (neo-decanyl ethyl) azelate

To a 2-l. round-bottomed reaction flask equipped with a stirrer, a thermometer and a Dean-Stark water trap fitted to a reflux condenser are added 188 g. azelaic acid (1.0 mole), 475 g. neo-decanoic acid monoethoxylate (2.2 moles), 3.3 g. conc. sulfuric acid (0.5 wt. percent), and 100 g. benzene as entrainer. The reaction mixture is heated in 0.5 hr. to 142° C. and maintained at this temperature until esterification is complete. After the crude product is cooled to room temperature, it is washed with 10% NaOH and then with water until neutral. The ester is stripped in the presence of 0.5 wt. percent activated charcoal (Nuchar C–190–N), up to a pot temperature of 250° C./2 mm. Hg pressure. The final product is vacuum filtered through a thin bed of celite as a filter aid and then analyzed for acidity, and product purity by GC. This procedure was followed in several experiments to determine product purity with various catalysts, catalyst concentrations, reaction times, and temperatures. The conversions and yields are shown in Table II and the product purity is shown in Table III.

TABLE II

| Run | Reaction time (Hrs.) | Maximum temp. (° C.) [1] | Entrainer | Catalyst | Catalyst conc. (wt. percent) [3] | Conversion (percent) [2] | In hand yield, mole percent |
|---|---|---|---|---|---|---|---|
| 1 | 1.3 | 162 | Benzene | pTSA | 1.0 | 95.5 | 90.0 |
| 2 | 0.8 | 160 | do | $H_2SO_4$ / $H_3PO_2$ | 0.5 / 0.25 | 100.0 | 98.0 |
| 3 | 0.8 | 142 | do | $H_2SO_4$ | 0.5 | 96.4 | 92.8 |
| 4 | 2.0 | 210 | Xylene | $SnC_2O_4$ | 1.0 | 96.6 | 93.0 |

[1] Reaction mixture brought to temperature in ½ hr. and maintained at temperature until esterification completed.
[2] Determined by titration of residual acid.
[3] Based on total reactants.

TABLE III

| Run | Product purity [1] (wt. percent) [2,3] | Neo-decanoic acid monoethoxylate | Ethylene glycol di-neo-decanoate | Diethylene glycol di-neo-decanoate |
|---|---|---|---|---|
| 1 | 96.8 | 1.9 | 0.9 | 0.4 |
| 2 | 96.9 | 0.6 | 2.5 | 0.0 |
| 3 | 96.8 | 0.9 | 2.0 | 0.3 |
| 4 | 99.0 | 1.0 | 0.0 | 0.0 |

[1] Product purified after stripping by contact with ½ wt. percent alumina at 110° C. and vacuum filtration through attapulgus clay.
[2] Determined by GC analysis.
[3] Thus, the data shown above in Tables II and III readily reveals the excellent selectivity to the tetraester by virtue of this process. Utilization of a monoethoxylate not possessing the sterically hindered carboxylic acid function would show no such selective results. Instead, as mentioned, the expected ester interchange reaction would occur and, therefore, the mixture of products inherent in present polymeric plasticizers would be produced.

EXAMPLE 2

In equipment similar to that used in Example 1, neo-decanoic acid monoethoxylate was reacted with trimellitic anhydride for 80 min. at a maximum temperature at 215° C. Toluene was the entrainer and a 1% stannous oxalate catalyst was employed. At the end of the reaction period there was a 97% conversion with a total yield of 89% of the tri(ethyl neo-decanyl) trimellitate. After stripping and filtration GC analysis of the product showed 1.7% produce showed 1.7% diester, 0.9% monoethyoxylate and 97.4% tri(ethyl neo-decanyl)trimellitate.

EXAMPLE 3

The following data compare two tetraesters, formed by the reaction of neo-decanoic acid monoethoxylate with azelaic acid and with adipic acid and two commonly used polymeric plasticizers, and a monomeric plasticizer.

TABLE VI

| Plasticizer | Bis (neo-decanyl ethyl) azelate | Polymeric plasticizer | Polymeric plasticizer |
|---|---|---|---|
| PHR plasticizer | 49 | 55 | 60 |
| 100% modulus, p.s.i | 1,925 | 2,085 | 2,335 |
| Shore A hardness | 83 | 82 | 85 |
| Aged 7 days 136° C.: volatility, wt. percent | 1.5 | 1.7 | 1.6 |
| Exudation: (⅜″ loop test) | Slight | None | None |
| Volume resistivity: | | | |
| 23° C. ($10^{14}$ ohm-cm.) | 6.6 | 4.4 | 15.6 |
| 90° C. ($10^{11}$ ohm-cm.) | 4.3 | 3.4 | 5.5 |

Formulation: Geon 101 EP, 100; plasticizer, as shown; Burgess No. 30 clay, 10; Dythal, 7; stearic acid, 0.5; antioxidant, 0.75 weight percent of total plasticizer; paraplex G-62-5.

TABLE IV.—COMPOUND DATA [1]

| Plasticizer | Polymeric plasticizer | Ditridecyl phthalate | [3] | Bis(ethyl neo-decanyl) azelate | Bis(ethyl neo-decanyl) adipate |
|---|---|---|---|---|---|
| Parts | 55 | 55 | 55 | 55 | 55 |
| Compound number [2] | 1 | 2 | 3 | 4 | 5 |
| Original properties: | | | | | |
| Ultimate tensile, p.s.i | 3,045 | 2,920 | 3,060 | 3,045 | 3,095 |
| Ultimate elongation, percent | 255 | 255 | 285 | 295 | 290 |
| 100% modulus, p.s.i | 2,410 | 2,155 | 2,045 | 1,770 | 1,795 |
| Hardness, Shore "A" | 88 | 87 | 82 | 80 | 80 |
| Aged 7 days at 136° C. (turntable oven-air at 110 f.p.m. at sample): | | | | | |
| Ultimate tensile, p.s.i | 2,835 | 2,880 | 2,895 | 2,760 | 2,970 |
| Ultimate elongation, percent | 180 | 185 | 230 | 245 | 220 |
| 100% modulus, p.s.i | 2,730 | 2,735 | 2,375 | 2,080 | 2,450 |
| Elongation retained, percent | 71 | 72 | 81 | 83 | 76 |
| Compatibility, ⅜″ loop test exudation 1 day | Slight | Moderate | [4] | [4] | None |
| Clash-Berg, Tf, ° C | −7.0 | −26.5 | −13.0 | −29.0 | −26.5 |

[1] Formulation: Geon 101EP, 100, paraplex G-62-5, plasticizer, as indicated, Burgess No. 30 clay, 10, stearic acid, 0.5 BPA, 0.75 wt percent of total plasticizer conc.
[2] Milling conditions: One minute preheat; front roll 38 f.p.m., 320° F.; back roll 42 f.p.m, 320° F.; molding conditions: 345° F. and 1,000 p.s.i.
[3] Polymeric type plasticizer based on adipic acid.
[4] Very slight.

EXAMPLE 4

The following table compares the azelaic ester of a $C_{10}$ neo-acid monoethoxylate with a polyester type plasticizer. It can be seen that the properties are similar and that the novel compound of this invention has improved low temperature properties. (Low temperature properties are measured by the Clash-Berg test which involves determining the apparent torsion modulus of elasticity of the test compound. An observation of torque and deflection is made after an arbitrary fixed time of load application. This procedure is employed at selected temperature intervals over a wide range.)

TABLE V

| Plasticizer | Azelate ester of $C_{10}$ neo-acid monoethoxylate | Polyester plasticizer |
|---|---|---|
| PHR plasticizer | 55 | 55 |
| 100% modulus, p.s.i | 1,730 | 2,145 |
| Shore A hardness | 82 | 86 |
| Aged 7 days 136° C.: | | |
| Elongation retained, percent | 90 | 83 |
| Volatility, wt. percent | 2.8 | 2.8 |
| Exudation: | | |
| (⅜″ loop test) | Light | None |
| Volume resistivity: | | |
| 23° C. ($10^{10}$ ohm-cm.) | 0.8 | 3.2 |
| 90° C. ($10^{13}$ ohm-cm.) | 1.3 | 3.0 |
| Clash-Berg, Tf, ° C | −26 | −10 |

Formulation: Geon 101 EP, 100; plasticizer 55; Burgess No. 30 clay=10; Dythal, 7; stearic acid, 0.5; antioxidant, 0.75 wt. percent of plasticizer; paraplex G-62-5.

EXAMPLE 5

The following table shows that the compounds of this invention are more efficient since properties equivalent to known plasticizers may be obtained with a lesser amount of plasticizer.

EXAMPLE 6

To determine the compatibility of the novel plasticizers of this invention with several resin systems, the following experiments were performed:

(A) 25 wt. percent solutions of the following resins in methyl isobutyl ketone were evaluated:
 (i) vinyl chloride-vinyl acetate copolymer
 (ii) vinyl chloride-vinyl acetate-vinyl alcohol;
 (iii) carboxylated vinyl chloride-vinyl acetate.

To each solution an amount of plasticizer was added to equal 30 wt. percent based on resin solids. The clarify of each solution as well as the clarity of a 1 mil film cast on glass and dried at 250° F. was noted to determine compatibility.

The azelate, adipic and maleate diesters of neodecanoic acid monoethoxylate were tested. The results are shown in Table VII.

TABLE VII

| | (i) | | (ii) | | (iii) | |
|---|---|---|---|---|---|---|
| | Solution | Film | Solution | Film | Solution | Film |
| Adipate diester | Clear | Clear | Clear | Clear | Clear | Clear. |
| Azelate diester | do | do | do | do | do | Do. |
| Maleate diester | do | do | do | do | do | Do. |

A similar test was performed with acrylic resins. The solutions were made up in the same manner. Results are shown in Table VIII.

TABLE VIII

| | Acryloid B82 [1] | | Acryloid A21 [2] | | Lucite 6010 [3] | | Lucite 6011 [4] | |
|---|---|---|---|---|---|---|---|---|
| | Solution | Film | Solution | Film | Solution | Film | Solution | Film |
| Adipate diester | Clear | Clear | Clear | Clear | Clear | Clear | Clear | Clear. |
| Azelate diester | do | do | do | do | do | do | do | Do. |
| Maleate diester | do | do | do | do | do | do | do | Do. |

[1,2] Acrylic resins supplied by Rohm & Haas.
[3,4] Acrylic resins supplied by DuPont. [3] is medium to high molecular weight methyl methacrylate; [4] is medium molecular weight methyl methacrylate.

What is claimed is:
1. An ester having the following structural formula:

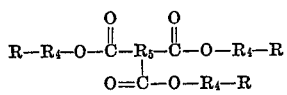

and $R_4$ is a $C_2$–$C_8$ alkylene radical, $R_5$ is selected from the group consisting of $C_0$–$C_{11}$ alkylene and arylene radicals; and R is further defined by:

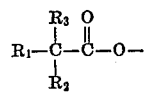

wherein $R_1$, $R_2$ and $R_3$ are each $C_1$–$C_{20}$ hydrocarbyl radicals.

2. The ester of claim 1 wherein $R_1$ is a $C_5$–$C_{13}$ alkyl radical; $R_2$ and $R_3$ are each $C_1$–$C_2$ alkyl radicals; and $R_5$ is a $C_4$–$C_{11}$ alkylene radical.

References Cited

UNITED STATES PATENTS

| | | | |
|---|---|---|---|
| 2,575,196 | 11/1951 | Smith | 260—410.6 |
| 3,414,609 | 12/1968 | Hagemeyer et al. | 260—475 |

FOREIGN PATENTS

| | | | |
|---|---|---|---|
| 1,269,627 | 7/1961 | France | 260—488 |

OTHER REFERENCES

Wrigley et al., J. Am. Oil Chemists' Soc., January 1959, pp. 34–36.

LORRAINE A. WEINBERGER, Primary Examiner
R. S. WEISSBERG, Assistant Examiner

U.S. Cl. X.R.

260—31.6, 475 P, 485 G